(12) United States Patent
Duzdar et al.

(10) Patent No.: US 8,072,335 B2
(45) Date of Patent: Dec. 6, 2011

(54) ANTENNA ASSEMBLIES FOR REMOTE APPLICATIONS

(75) Inventors: Ayman Duzdar, Holly, MI (US);
Haiyang Wang, Grand Blanc, MI (US);
Huzefa Abdulkader Bharmal, Rochester Hills, MI (US); Joseph M. Combi, Grand Blanc, MI (US)

(73) Assignee: Laird Technologies, Inc., Chesterfield, MO (US)

( * ) Notice: Subject to any disclaimer, the term of this patent is extended or adjusted under 35 U.S.C. 154(b) by 329 days.

(21) Appl. No.: 12/421,422

(22) Filed: Apr. 9, 2009

(65) Prior Publication Data
US 2010/0238012 A1 Sep. 23, 2010

Related U.S. Application Data

(60) Provisional application No. 61/162,116, filed on Mar. 20, 2009.

(51) Int. Cl.
*G08B 13/14* (2006.01)

(52) U.S. Cl. ............. 340/572.7; 340/572.3; 340/572.4; 340/572.8; 340/447; 340/10.1; 340/5.64; 340/602; 340/666; 235/449; 235/491; 235/492; 343/700 MS; 343/702; 343/722; 343/833; 343/834; 343/846; 343/848; 343/850

(58) Field of Classification Search ............. 340/572.7, 340/572.3, 572.4, 572.8, 447, 10.1, 5.644, 340/602, 666; 235/449, 491, 492; 343/700 MS, 343/702, 722, 833, 834, 846, 848, 850
See application file for complete search history.

(56) References Cited

U.S. PATENT DOCUMENTS

| | | | |
|---|---|---|---|
| 3,419,876 A | 12/1968 | Edwards et al. | |
| 4,814,783 A | 3/1989 | Shelton et al. | |
| 6,424,309 B1 | 7/2002 | Johnston et al. | |
| 6,480,162 B2 | 11/2002 | Sabet et al. | |
| 6,553,214 B1 | 4/2003 | Rabinovich et al. | |
| 6,768,461 B2 | 7/2004 | Huebner et al. | |
| 7,050,011 B2 | 5/2006 | Ghabra et al. | |
| 7,345,647 B1 | 3/2008 | Rodenbeck | |
| 7,545,328 B2 * | 6/2009 | Son et al. | 343/700 MS |
| 7,646,353 B2 * | 1/2010 | Lu et al. | 343/795 |
| 7,761,115 B2 * | 7/2010 | Castaneda et al. | 455/562.1 |
| 7,817,102 B2 * | 10/2010 | Taki et al. | 343/895 |

(Continued)

FOREIGN PATENT DOCUMENTS
CA 837266 3/1970

OTHER PUBLICATIONS

IEEE Xplore Login, http://ieeexplore.ieee.org/Xplore/login.jsp?url+/iel5/4446147/4458235/04458294.pdf?arnumber+4458294, printed as of Dec. 23, 2008.

(Continued)

*Primary Examiner* — Tai T Nguyen
(74) *Attorney, Agent, or Firm* — Harness, Dickey & Pierce, P.L.C.

(57) ABSTRACT

An antenna assembly is provided suitable for use with a remote communications module such as, for example, a keyless entry module, a tire pressure monitoring module, etc. The antenna assembly generally includes a support, a folded metallic antenna element mounted on the support, an amplifier coupled to the folded antenna element, and a transmission line coupled to the amplifier.

9 Claims, 16 Drawing Sheets

U.S. PATENT DOCUMENTS

2006/0170610 A1  8/2006  Rabinovich et al.
2006/0290468 A1  12/2006  Hidaka et al.
2008/0020723 A1  1/2008  Rabinovich et al.

OTHER PUBLICATIONS

RF Micro-Devices, DK1000, Theory of Operation 315MHz, 2 pages, HDP printed as of Mar. 31, 2009.

RF Micro-Devices, DK1001, Theory of Operation 433MHz, 2 pages, HDP printed as of Mar. 31, 2009.

RF Micro-Devices, DK1002, Theory of Operation 868MHz, 2 pages, HDP printed as of Mar. 31, 2009.

RF Micro-Devices, DK1000R, 315MHz Remote Keyless Entry Receiver, 6 pages, HDP printed as of Mar. 31, 2009.

RF Micro-Devices, DK1001R, 433MHz Remote Keyless Entry Receiver, 6 pages, HDP printed as of Mar. 31, 2009.

RF Micro-Devices, DK1002R, 868MHz Remote Keyless Entry Receiver, 6 pages HDP printed as of Mar. 31, 2009.

* cited by examiner

ANTENNA ASSEMBLIES FOR REMOTE APPLICATIONS

CROSS-REFERENCE TO RELATED APPLICATION

This application claims the benefit of U.S. Provisional Application No. 61/162,116, filed on Mar. 20, 2009. The entire disclosure of this application is incorporated herein by reference.

FIELD

The present disclosure relates generally to antenna assemblies, and more particularly to antenna assemblies for remote applications such as, for example, remote keyless entry applications, tire pressure monitoring/sensing applications, etc. for vehicles, etc.

BACKGROUND

This section provides background information related to the present disclosure, which is not necessarily prior art.

Remote keyless (RK) systems are designed to allow remote operations to be performed on property, premises, vehicles, etc. from remote locations. For example, remote keyless entry (RKE) systems, remote keyless ignition (RKI) systems, tire pressure monitoring (TPM) systems, etc. are often available in modern vehicles for allowing remote operations to be performed on the vehicles as desired. These systems, when installed to the vehicles, may allow, for example, for locking or unlocking power door locks of the vehicles, opening or closing power windows of the vehicles, monitoring air pressure in one or more tires of the vehicles, etc. (e.g., for performing functions of a traditional mechanical car key, tire gage, etc. etc.) from locations away from the vehicles and/or without physically contacting the vehicle.

Remote keyless systems typically operate by broadcasting radio waves on particular frequencies. For example, frequencies of 315 megahertz (MHz), 433 MHz, 868 MHz, etc. may be used in the United States, Europe, Asia, and the world in general. And, small, compact, low cost antenna assemblies operable at such frequencies are desirable for use with these remote keyless systems.

SUMMARY

This section provides a general summary of the disclosure, and is not a comprehensive disclosure of its full scope or all of its features.

Example embodiments of the present disclosure are generally directed toward antenna assemblies for remote communications modules. In one example embodiment, an antenna assembly generally includes a support, a folded metallic antenna element coupled to the support, an amplifier coupled to the folded antenna element, and a transmission line coupled to the amplifier.

In another example embodiment, a monopole antenna assembly generally includes a support and a folded metallic antenna element coupled to the support. The folded metallic antenna element includes first and second meandering portions. The first meandering portion is offset about ninety degrees relative to the second meandering portion. A low noise amplifier is coupled to the support and electrically coupled to the folded antenna element for amplifying signals received from the folded antenna element. And, a transmission line is electrically coupled to the low noise amplifier. The monopole antenna assembly is operable at a frequency of about 315 megahertz.

In another example embodiment, a dipole antenna assembly generally includes a support and a first folded metallic antenna element coupled to the support. The first folded metallic antenna element includes first and second meandering portions. The first meandering portion is offset about ninety degrees relative to the second meandering portion. A second folded metallic antenna element is coupled to the support. The second folded metallic antenna element includes first and second meandering portions. The first meandering portion is offset about ninety degrees relative to the second meandering portion. A low noise amplifier is coupled to the support and is electrically coupled to the first and second folded antenna elements for amplifying signals received from the first and second folded antenna elements. And, a transmission line is electrically coupled to the low noise amplifier. The first folded metallic antenna element is positioned in a generally mirror image orientation relative to the second folded metallic antenna element, and the dipole antenna assembly is operable at a frequency of about 433 megahertz.

Example embodiments of the present disclosure are also generally directed toward methods of making antenna assemblies for remote communications modules. One example method generally includes coupling a stamped and folded metallic sheet antenna element to a support, coupling the antenna element to an amplifier for amplifying signals received from the antenna element, and coupling the amplifier to a transmission line for outputting the amplified signals from the amplifier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a plan view of an example embodiment of an antenna assembly including one or more aspects of the present disclosure;

FIGS. 2, 3, and 4 are example radiation patterns illustrating vertical polarization gain (in decibels referenced to isotropic gain (dBi)) for the example antenna assembly shown in FIG. 1 at frequencies of 310 MHz, 315 MHz, and 320 MHz, respectively, when the antenna assembly is mounted inside a housing of the antenna assembly and oriented in a generally vertical plane and with a first, long axis of the antenna assembly oriented generally vertically;

FIGS. 5, 6, and 7 are example radiation patterns illustrating horizontal polarization gain (in decibels referenced to isotropic gain (dBi)) for the antenna assembly shown in FIG. 1 at frequencies of 310 MHz, 315 MHz, and 320 MHz, respectively, when the antenna assembly is mounted inside the housing and oriented in a generally vertical plane and with the first axis oriented generally vertically;

FIGS. 8, 9, and 10 are example radiation patterns illustrating vertical polarization gain (in decibels referenced to isotropic gain (dBi)) for the antenna assembly shown in FIG. 1 at frequencies of 310 MHz, 315 MHz, and 320 MHz, respectively, when the antenna assembly is mounted inside the housing and oriented in a generally vertical plane and with a second, short axis of the antenna assembly oriented generally vertically;

FIGS. 11, 12, and 13 are example radiation patterns illustrating horizontal polarization gain (in decibels referenced to isotropic gain (dBi)) for the antenna assembly shown in FIG. 1 at frequencies of 310 MHz, 315 MHz, and 320 MHz, respectively, when the antenna assembly is mounted inside the housing and oriented in a generally vertical plane and with the second axis oriented generally vertically;

FIGS. 14, 15, and 16 are example radiation patterns illustrating vertical polarization gain (in decibels referenced to isotropic gain (dBi)) for the antenna assembly shown in FIG. 1 at frequencies of 310 MHz, 315 MHz, and 320 MHz, respectively, when the antenna assembly is mounted inside the housing and oriented in a generally horizontal plane;

FIGS. 17, 18, and 19 are example radiation patterns illustrating horizontal polarization gain (in decibels referenced to isotropic gain (dBi)) for the antenna assembly shown in FIG. 1 at frequencies of 310 MHz, 315 MHz, and 320 MHz, respectively, when the antenna assembly is mounted inside the housing and oriented in a generally horizontal plane;

Figure 21:
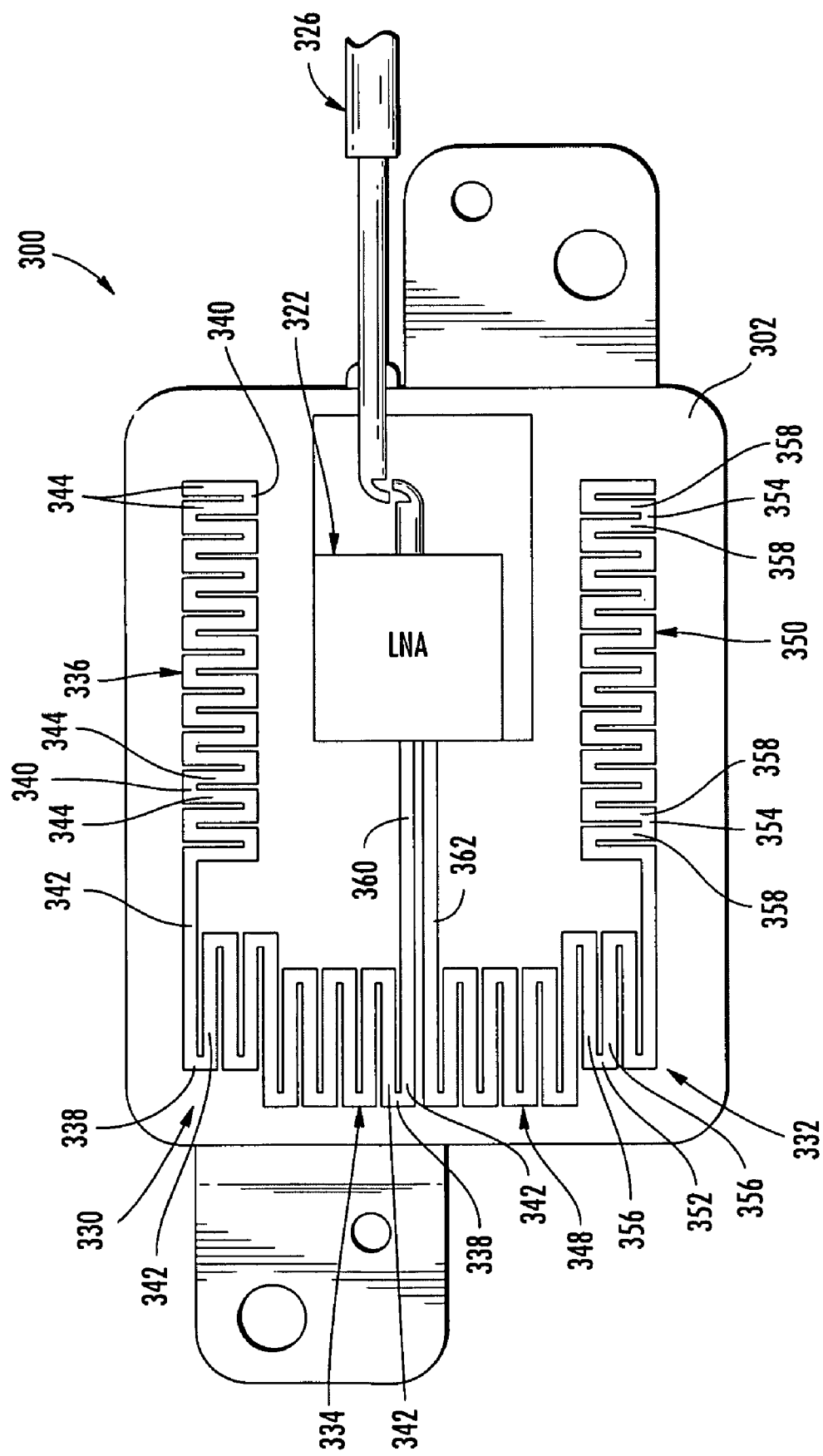
FIG. 21 is a plan view of still another example embodiment of an antenna assembly including one or more aspects of the present disclosure.
Figure 24:
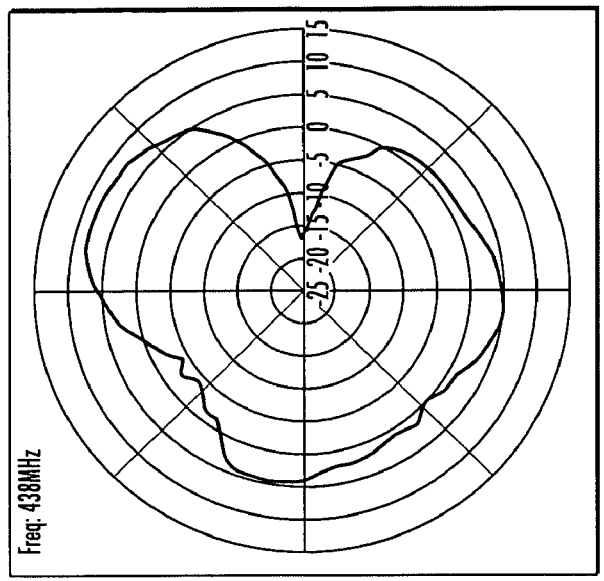
Figure 23:
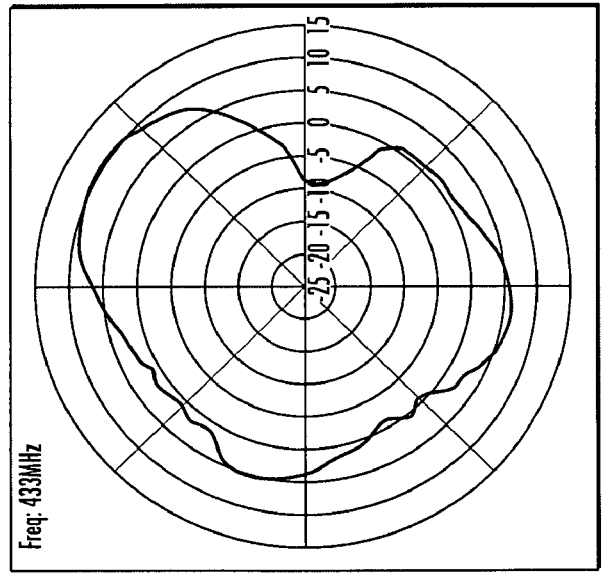
Figure 22:
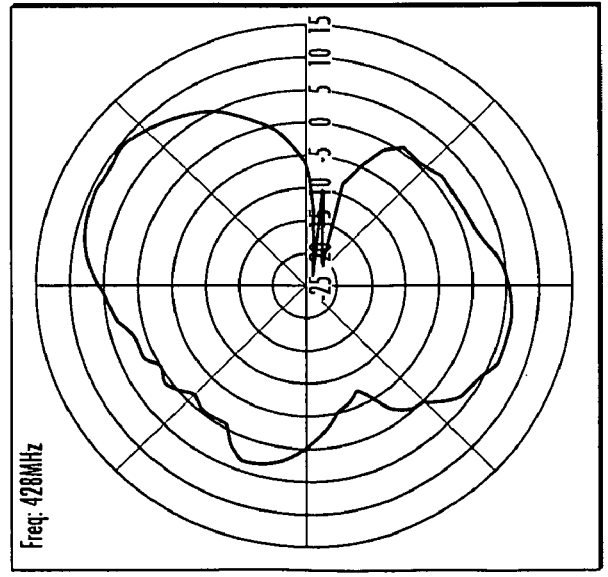
Figure 27:
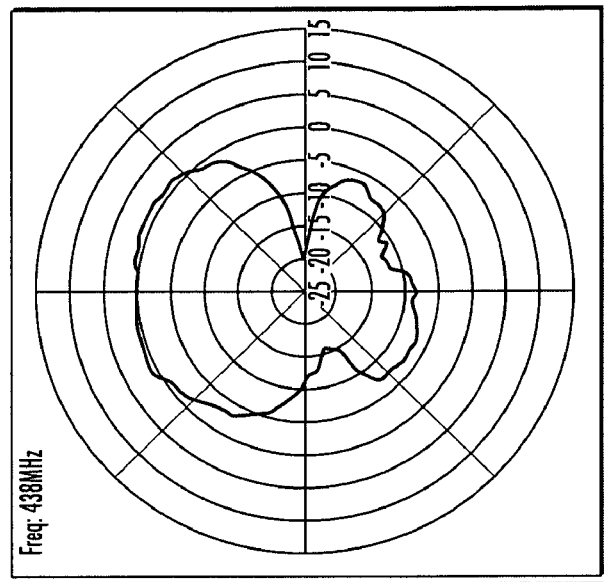
Figure 26:
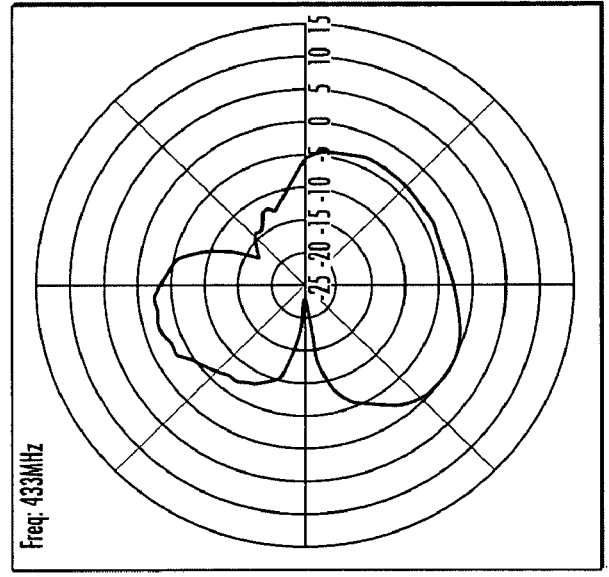
Figure 25:
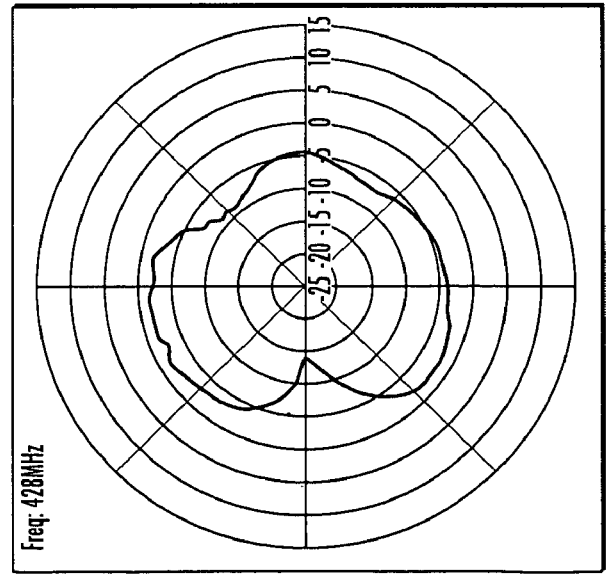
Figure 30:
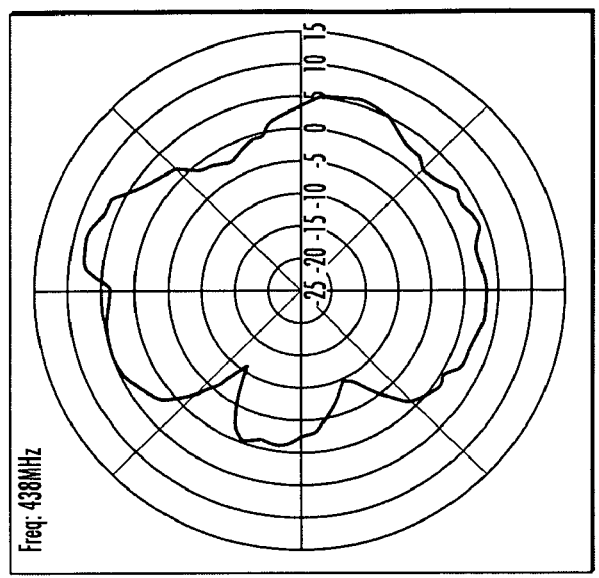
Figure 29:
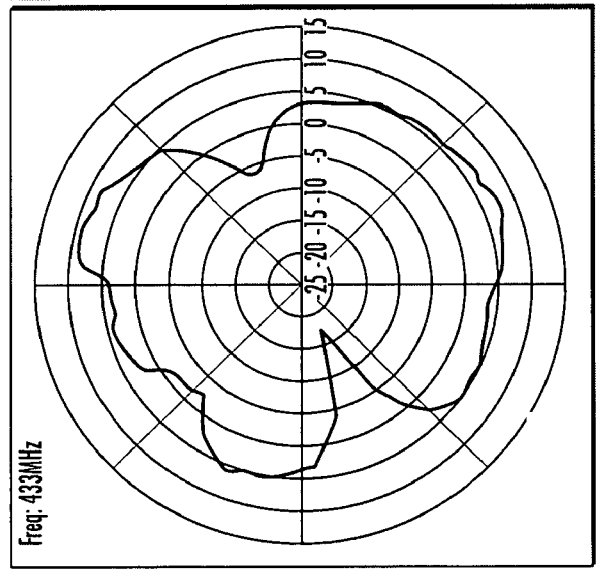
Figure 28:
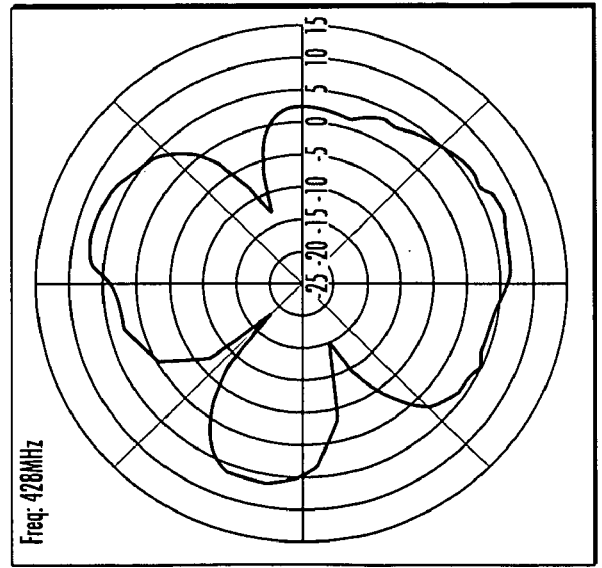
Figure 33:
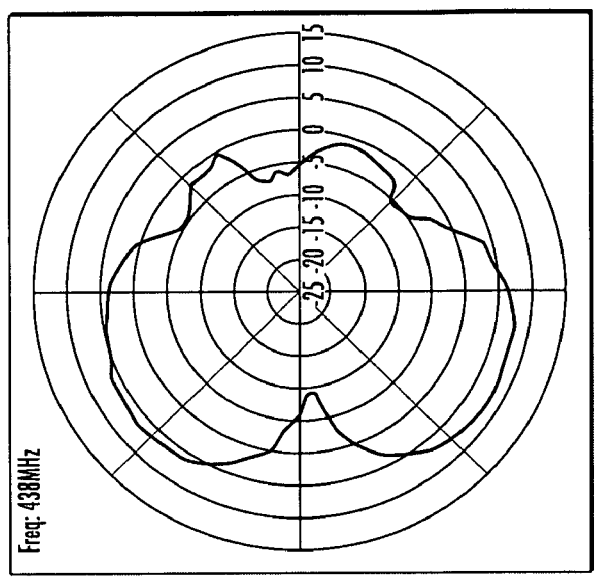
Figure 32:
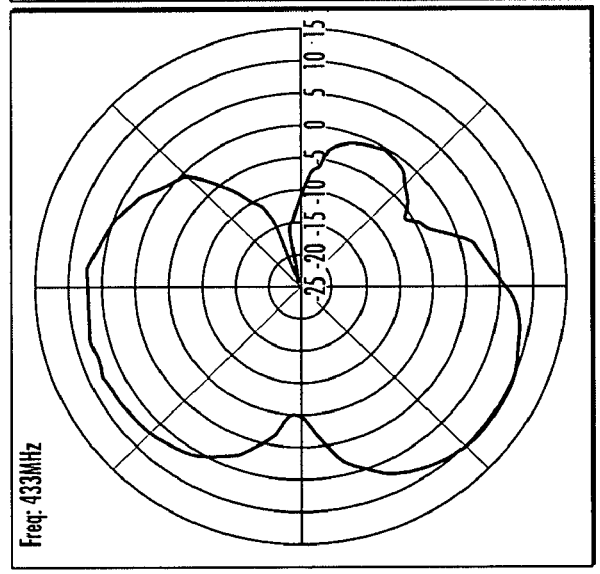
Figure 31:
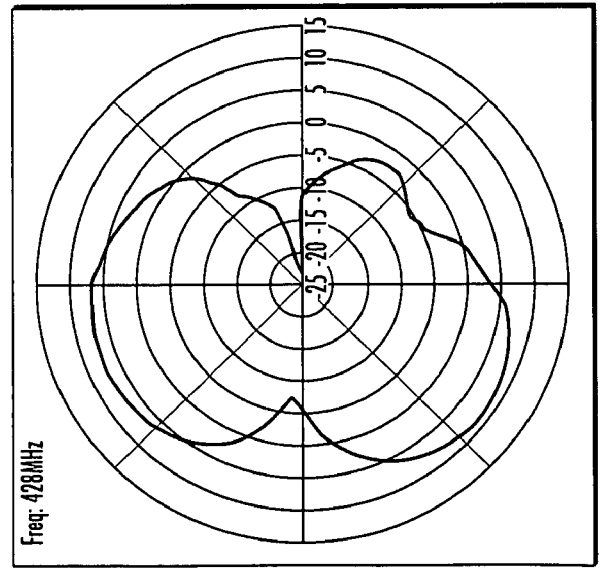
Figure 36:
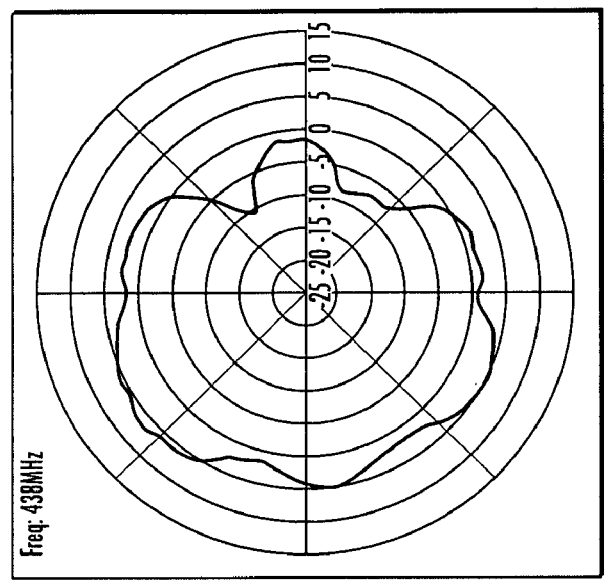
Figure 35:
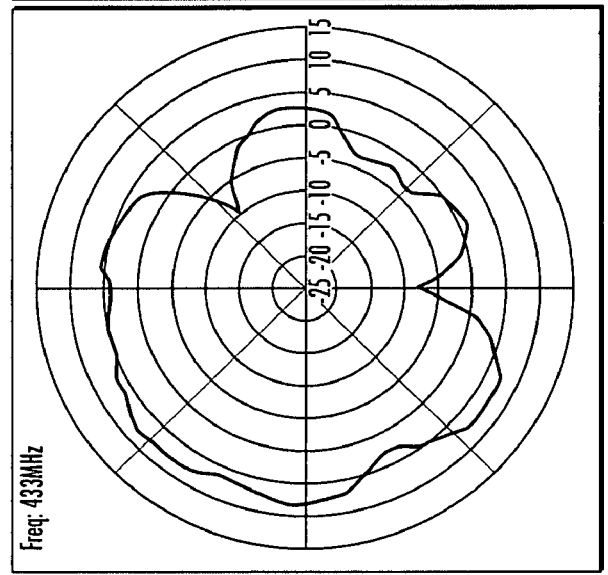
Figure 34:
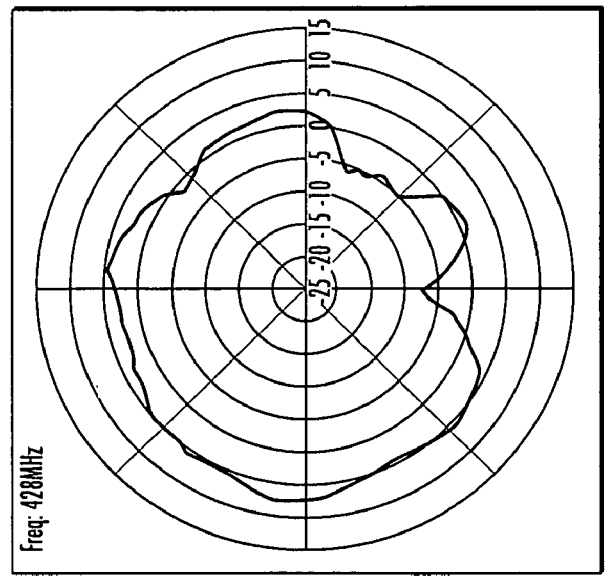
Figure 39:
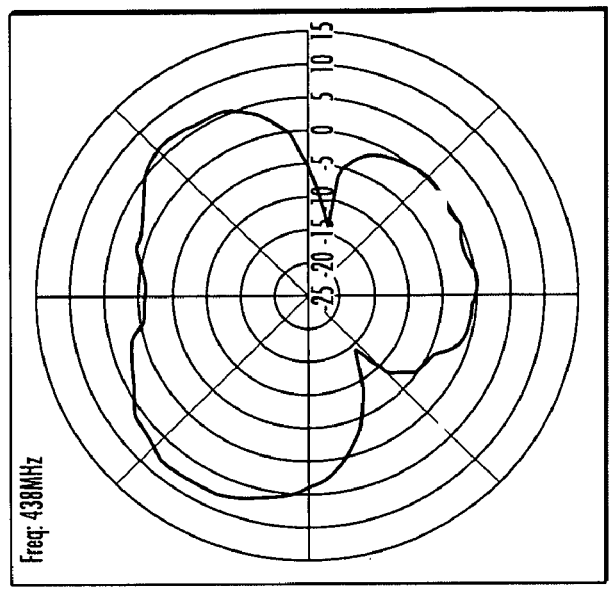
Figure 38:
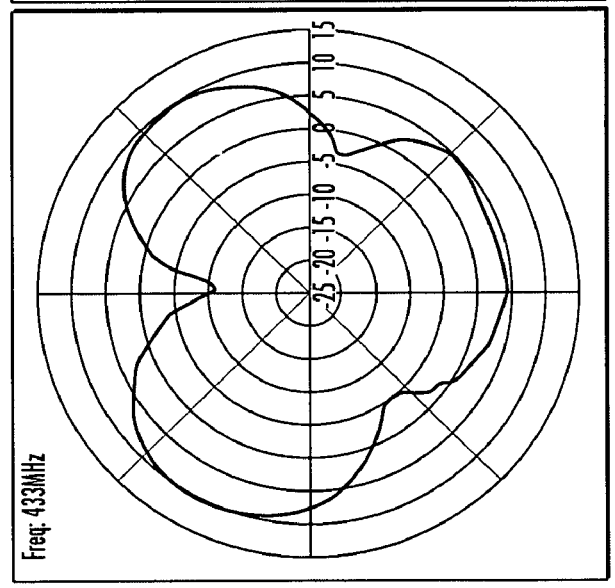
Figure 37:
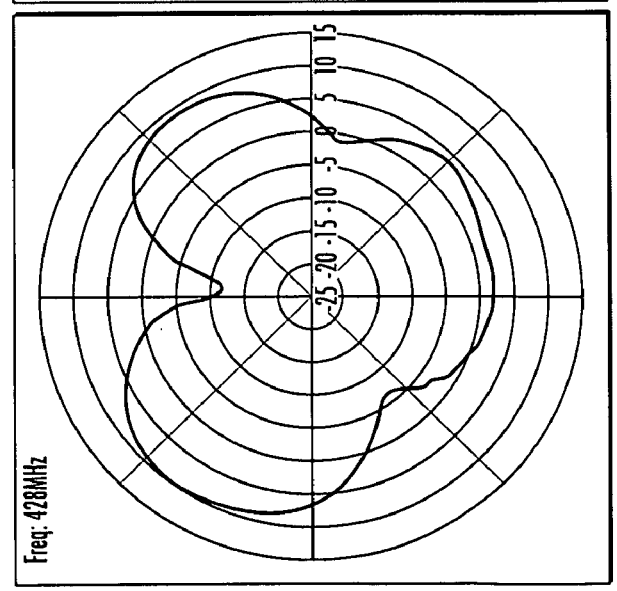
Figure 40:
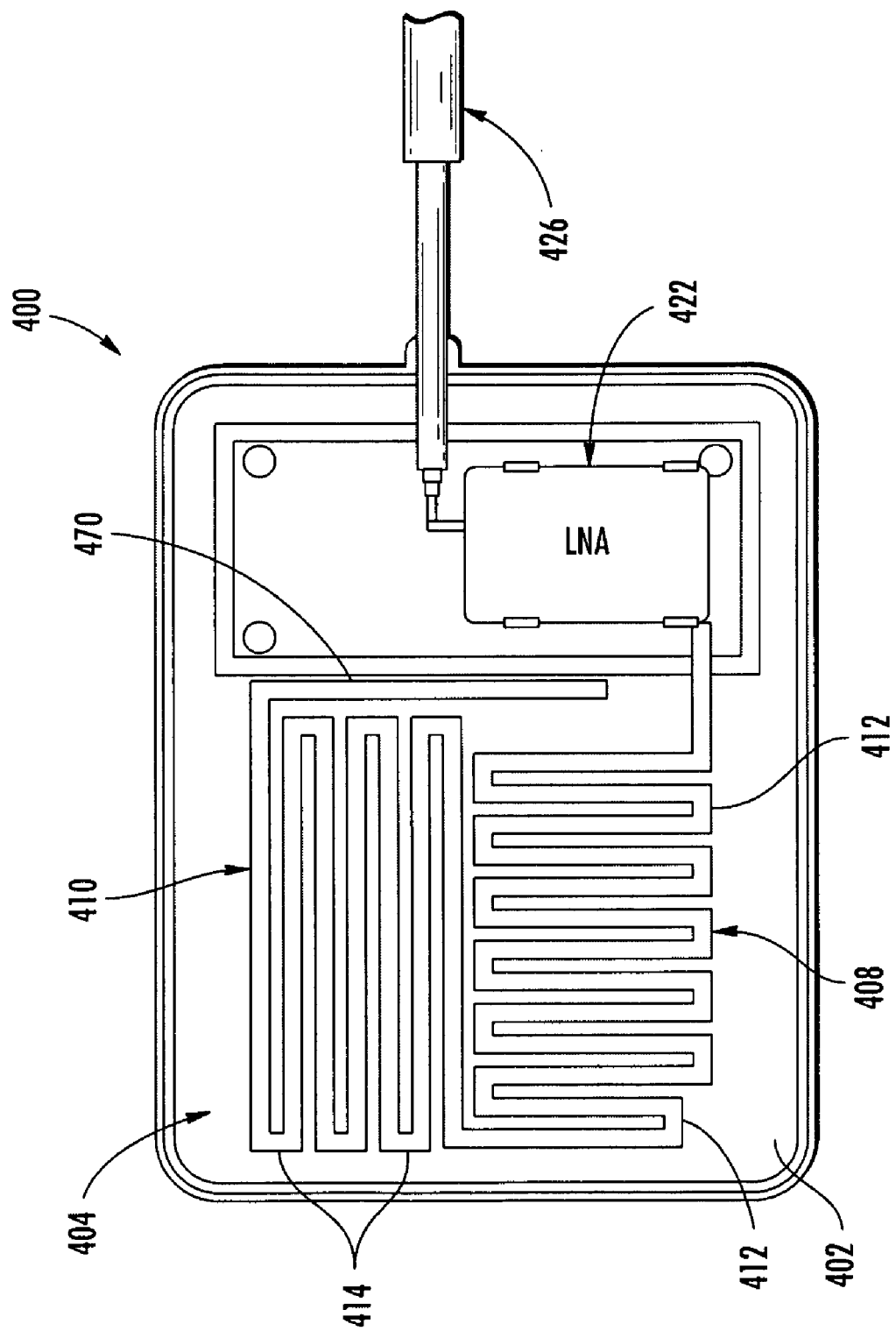

FIGS. 22, 23, and 24 are example radiation patterns illustrating vertical polarization gain (in decibels referenced to isotropic gain (dBi)) for the antenna assembly shown in FIG. 21 at frequencies of 428 MHz, 433 MHz, and 438 MHz, respectively, when the antenna assembly is mounted inside a housing of the antenna assembly and oriented in a generally vertical plane and with a first, long axis of the antenna assembly oriented generally vertically;

FIGS. 25, 26, and 27 are example radiation patterns illustrating horizontal polarization gain (in decibels referenced to isotropic gain (dBi)) for the antenna assembly shown in FIG. 21 at frequencies of 428 MHz, 433 MHz, and 438 MHz, respectively, when the antenna assembly is mounted inside the housing and oriented in a generally vertical plane and with the first axis oriented generally vertically;

FIGS. 28, 29, and 30 are example radiation patterns illustrating vertical polarization gain (in decibels referenced to isotropic gain (dBi)) for the antenna assembly of FIG. 21 at frequencies of 428 MHz, 433 MHz, and 438 MHz, respectively, when the antenna assembly is mounted inside the housing and oriented in a generally vertical plane and with a second, short axis of the antenna assembly oriented generally vertically;

FIGS. 31, 32, and 33 are example radiation patterns illustrating horizontal polarization gain (in decibels referenced to isotropic gain (dBi)) for the antenna assembly shown in FIG. 21 at frequencies of 428 MHz, 433 MHz, and 438 MHz, respectively, when the antenna assembly is mounted inside the housing and oriented in a generally vertical plane and with the second axis oriented generally vertically;

FIGS. 34, 35, and 36 are example radiation patterns illustrating vertical polarization gain (in decibels referenced to isotropic gain (dBi)) for the antenna assembly shown in FIG. 21 at frequencies of 428 MHz, 433 MHz, and 438 MHz, respectively, when the antenna assembly is mounted inside the housing and oriented in a generally horizontal plane;

FIGS. 37, 38, and 39 are example radiation patterns illustrating horizontal polarization gain (in decibels referenced to isotropic gain (dBi)) for the antenna assembly shown in FIG. 21 at frequencies of 428 MHz, 433 MHz, and 438 MHz, respectively, when the antenna assembly is mounted inside the housing and oriented in a generally horizontal plane; and FIG. 40 is a plan view of another example embodiment of an antenna assembly including one or more aspects of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to various aspects of the present disclosure, antenna assemblies are provided suitable for operation with wireless applications such as, for example, remote keyless entry modules, remote keyless ignition modules, tire pressure monitoring modules, other remote communications modules, etc. The antenna assemblies are configured to, for example, receive signals in connection with operation of the wireless applications. But it should be appreciated that the antenna assemblies may also be configured to transmit signals in connection with operation of the wireless applications within the scope of the present disclosure.

As an example, antenna assemblies of the present disclosure may be included as part of remote keyless modules (e.g., remote keyless entry modules, remote keyless ignition modules, etc.) for vehicles (e.g., automobiles, motorcycles, boats, etc.). The antenna assemblies may be disposed within protective environmental covers (e.g., for protecting the antenna elements against ingress of debris, etc.) and coupled to the vehicles for operation. And, the installed antenna assemblies may receive desired frequency signals (e.g., from a key, a fob, etc.) for initiating a desired vehicle operation (e.g., unlocking doors, starting ignitions, etc.).

Antenna assemblies of the present disclosure are configured to receive signals at one or more particular frequencies (e.g., working frequencies, etc.). For example, example embodiments of antenna assemblies may be configured to receive signals at frequencies of about 315 megahertz (MHz), at frequencies of about 433 MHz, at frequencies of about 868 MHz, etc. for operation. In other example embodiments, antenna assemblies may be configured to receive signals at one or more different frequencies within the scope of the present disclosure.

Figure 1:
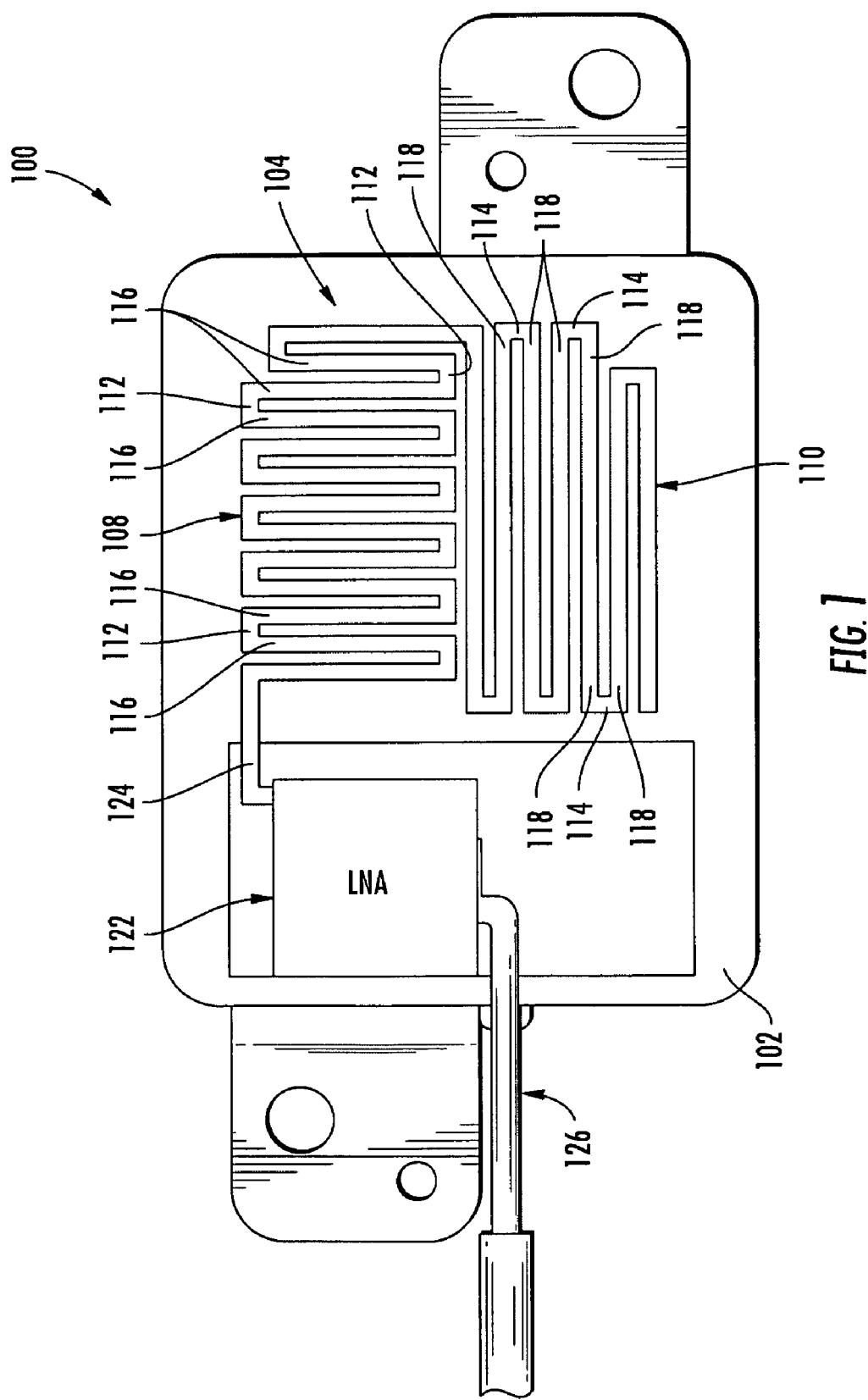

With reference now to the drawings, FIG. 1 illustrates an example embodiment of an antenna assembly 100 including one or more aspects of the present disclosure. The illustrated antenna assembly 100 generally defines a quarter wave monopole antenna assembly operable (or tuned for operation), for example, at a typical frequency of about 315 megahertz (MHz). And, the example antenna assembly 100 may be included, for example, as part of a remote keyless entry module of a vehicle, etc. for receiving signals in connection with desired vehicle operations such as locking and/or unlocking vehicle doors. The antenna assembly 100 may be tuned to a center frequency between about 314 MHz and about 316 MHz, inclusive, or between about 310 MHz and about 320 MHz, inclusive, or between bands of other frequencies, etc. within the scope of the present disclosure. And, in some example embodiments, antenna assemblies may be configured such that the antenna assemblies are operable at a single frequency of 315 MHz.

As shown in FIG. 1, the illustrated antenna assembly 100 generally includes a support 102 and an antenna element 104 supported by the support 102 (e.g., coupled to the support 102, etc.). The support 102 may be formed from suitable material such as, for example, plastics (e.g., low radio frequency loss plastics, etc.), composites, low dielectric constant materials, other nonconductive materials, etc. suitable for supporting the antenna element 104. And, the antenna element 104 may be coupled to the support 102 as desired by mechanical fasteners, heat staking, welds, etc. within the scope of the present disclosure. The support 102 and antenna element 104 may be included within (e.g., mounted within, etc.) or formed as part of a housing (not shown) for protecting the antenna element 104 from damage, ingress of debris, etc. In the illustrated embodiment, the portion of the support 102 to which the antenna element 104 is coupled does not include a circuit board (e.g., the portion of the illustrated support 102 to which the antenna element 104 is coupled is not a printed circuit board (PCB), etc.), and the illustrated antenna element 104 is not etched on the support 102. In other example embodiments, however, antenna assemblies may have supports that include one or more printed circuit boards, for example, for use with operation of the antenna assemblies. In still other example embodiments, antenna assemblies may have antenna elements supported directly by housings, etc. such that the antenna elements are mounted on, coupled to, etc. the housings (e.g., housings formed from suitable material such as, for example, plastics (e.g., low radio frequency loss plastics, etc.), composites, low dielectric constant materials, other nonconductive materials, etc. suitable for supporting the antenna elements).

The illustrated antenna element 104 includes a generally folded design, shape, etc. such that the antenna element 104 has a first meandering, bending, etc. portion 108 and a second meandering, bending, etc. portion 110 (e.g., for providing extended length to the antenna element 104, for providing a desired length to the antenna element 104 (e.g., for receiving desired frequencies, etc.), etc.). In the illustrated embodiment, the first meandering portion 108 is offset about ninety degrees relative to the second meandering portion 110. And, the first meandering portion 108 includes twelve bending points 112, and the second meandering portion 110 includes six bending points 114. In the illustrated embodiment, bending points 112 and 114 are formed between generally parallel straight portions 116 and 118 of the first and second meandering portions 108 and 110, respectively.

The first and/or second meandering portions 108 and/or 110 of the antenna assembly 100 may be oriented, shaped, etc. differently than illustrated herein (e.g., offset by amounts other than ninety degrees (e.g., thirty degrees, forty-five degrees, fifty degrees, sixty degrees, etc.), etc.) within the scope of the present disclosure. And, the first and/or second meandering portions 108 and/or 110 may include more than or less than twelve and six, respectively, bending points 112 and 114 within the scope of the present disclosure. For example, FIG. 20 (which will be described in more detail hereinafter) illustrates an example embodiment of an antenna assembly 200 in which an antenna element 204 includes a second meandering portion 210 with eight bending points 214 (e.g., for use in tuning the antenna assembly 200 to receive one or more desired frequencies, etc.).

The meandering configuration of the antenna element 104 may help the antenna element 104 fit within the defined area of the support 102, while still being tuned to the desired frequency of operation. The meandering configuration of the antenna element 104 may also help make the antenna element 104 efficient to receive both vertical and horizontal polarization signals. In addition, the number of bending points 112 and 114 of the antenna element 104 (e.g., of the first and second meandering portions 108 and 110, etc.) may be adjusted as desired to help tune the antenna assembly 100 to receive one or more desired frequencies, and/or the length of the first and/or second meandering portions 108 and/or 110 may be adjusted as desired (e.g., lengthened or shortened, etc.) to help tune the antenna assembly 100 to receive one or more desired frequencies, and/or spacing between adjacent straight portions 116 and 118 of the respective first and second meandering portions 108 and 110 may be adjusted as desired to help tune the antenna assembly 100 to receive one or more desired frequencies, and/or the location/position of the antenna element 104 on the support 102 may be adjusted as desired to help tune the antenna assembly 100 to receive one or more desired frequencies.

The illustrated antenna element 104 may be formed by suitable operations from a sheet of metallic material. For example, the folded design of the antenna element 104 may be stamped from a sheet of metallic material, such that the antenna element 104 generally includes (e.g., defines, etc.) a stamped and folded metallic sheet antenna element 104. The stamped and folded metallic sheet antenna element 104 may then be coupled to the support 102. Suitable metallic materials for forming the antenna element 104 may include, for example, copper, silver, gold, alloys, combinations thereof, other electrically-conductive materials, etc. In other example embodiments, antenna assemblies may include antenna elements in which folded designs of the antenna elements are cut from sheets of metallic material, etc. And, in still other example embodiments, antenna assemblies may include antenna elements stamped, cut, etc. from sheets of metallic material and bent to form desired folded designs, etc.

With continued reference to FIG. 1, an amplifier 122 (e.g., a low noise amplifier (LNA), etc.) is provided for amplifying signals received by the antenna element 104. The amplifier 122 is supported by (e.g., coupled to, etc.) the support 102 toward an end potion of the support 102, and is coupled (e.g., electrically coupled via solder connections, etc.) to the antenna element 104 (e.g., for operation, etc.) by a generally straight end portion 124 of the antenna element 104 located adjacent the antenna element's first meandering portion 108. The amplifier 122 may be printed on a circuit board, etc. And, a transmission line 126 is coupled (e.g., electrically coupled via solder connections, etc.) to the amplifier 122 for outputting amplified signals from the amplifier 122 to a suitable power source (e.g., a radio frequency power source, etc.), receiver, etc. The transmission line 126 couples to the amplifier 122 such that the amplifier 122 is disposed (e.g., electrically disposed, etc.) generally between the antenna element 104 and the transmission line 126. The transmission line 126 may include any suitable line such as, for example, a coaxial cable, etc. within the scope of the present disclosure. The location, configuration, etc. of the amplifier 122 and/or the transmission line 126 may be adjusted as desired to also help tune the antenna assembly 100 to receive one or more desired frequencies.

Figures 2, 3, 4:
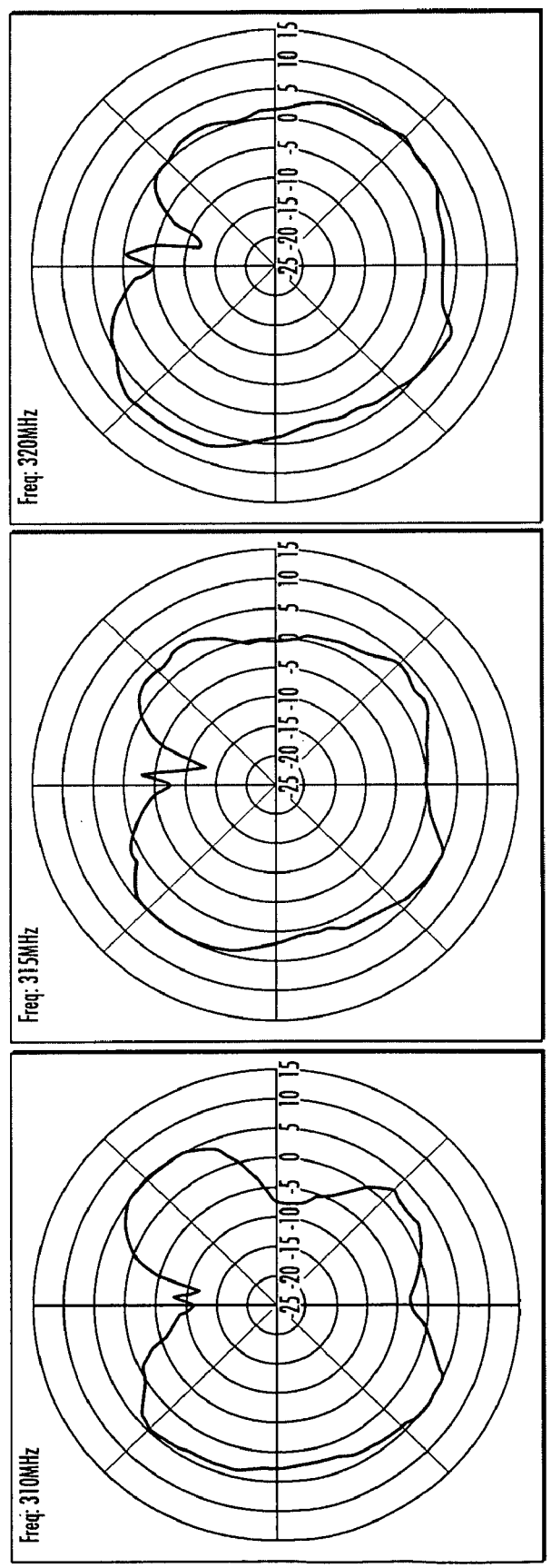
Figures 5, 6, 7:
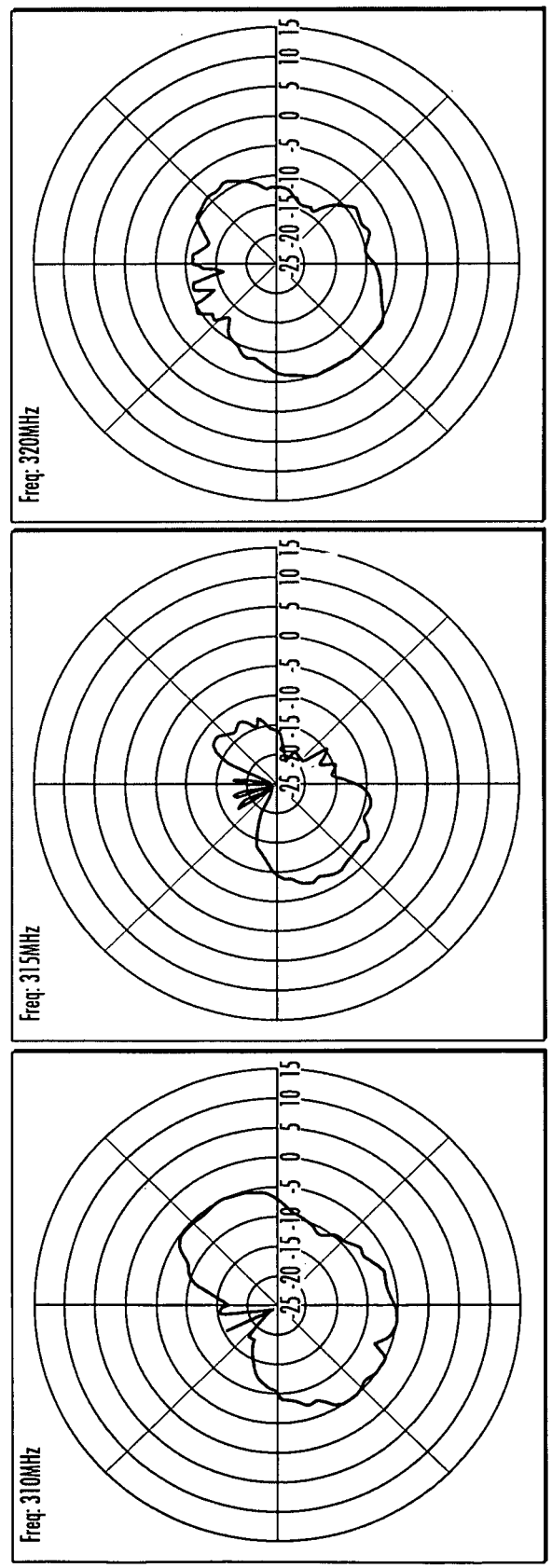

FIGS. 2 through 19 are example radiation patterns illustrating gain (in decibels referenced to isotropic gain (dBi)) for the example antenna assembly shown in FIG. 1. More particularly, FIGS. 2, 3, and 4 illustrate vertical polarization gain for the antenna assembly at frequencies of 310 MHz, 315 MHz, and 320 MHz, respectively, when the antenna assembly is mounted with the support oriented in a generally vertical plane and with a first, long axis (FIG. 1) of the antenna assembly oriented generally vertically. And, FIGS. 5, 6, and 7 illustrate horizontal polarization gain for the antenna assembly at frequencies of 310 MHz, 315 MHz, and 320 MHz, respectively, when the antenna assembly is mounted with the support oriented in a generally vertical plane and with the first axis oriented generally vertically.

Figures 8, 9, 10:
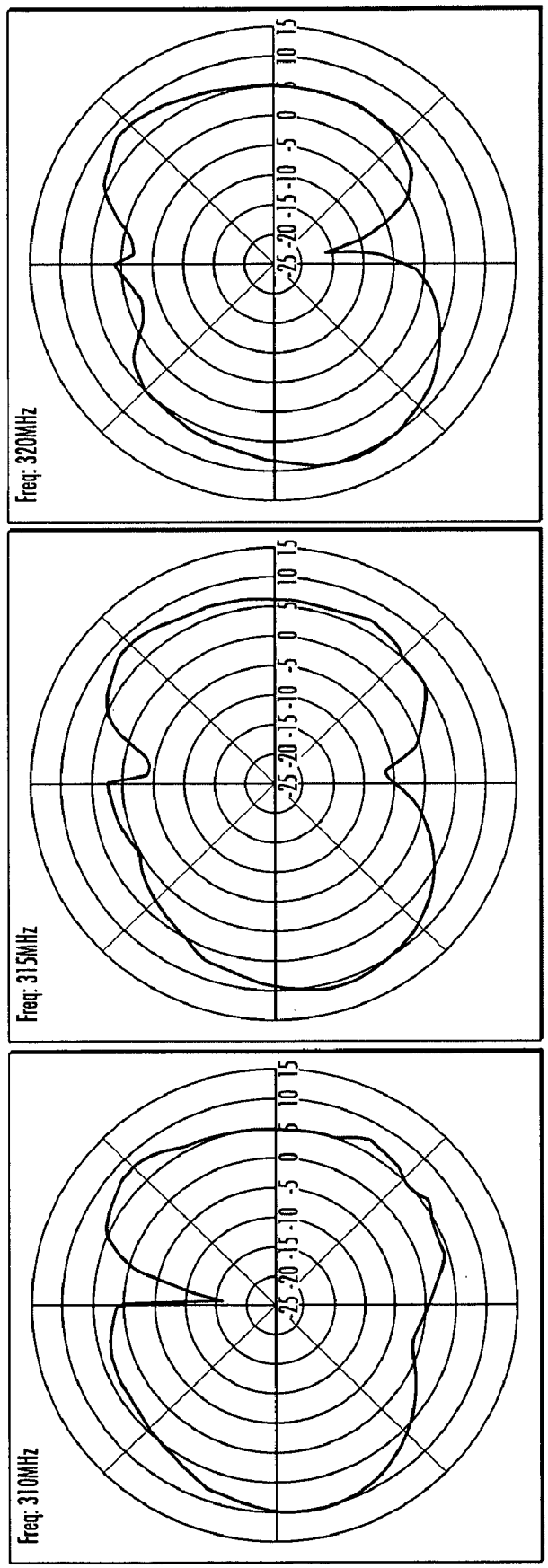
Figure 13:
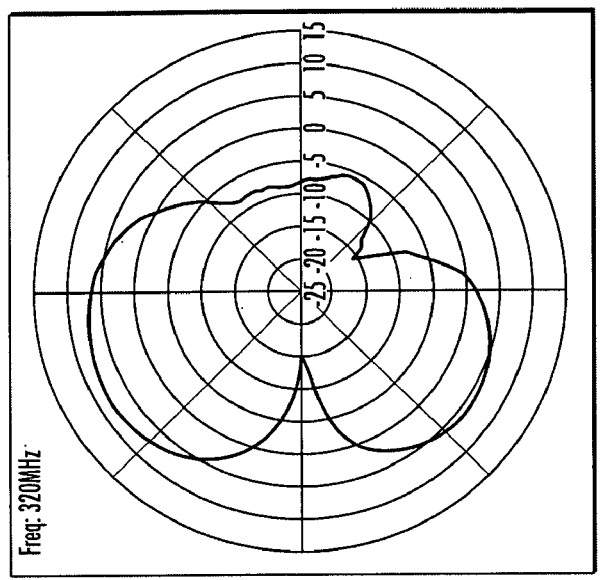
Figure 12:
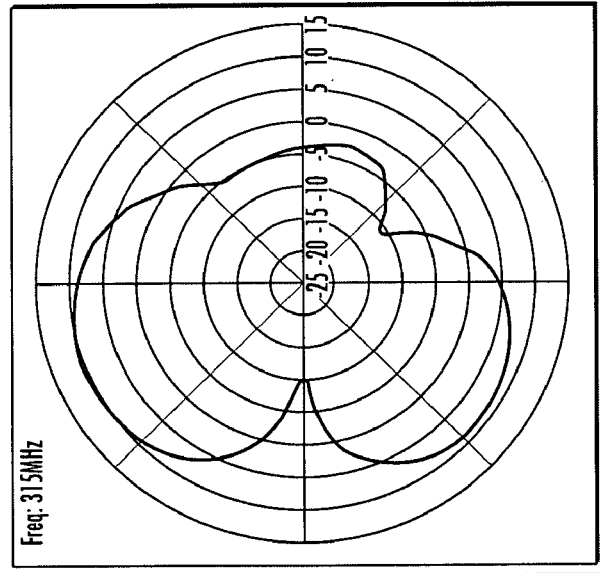
Figure 11:
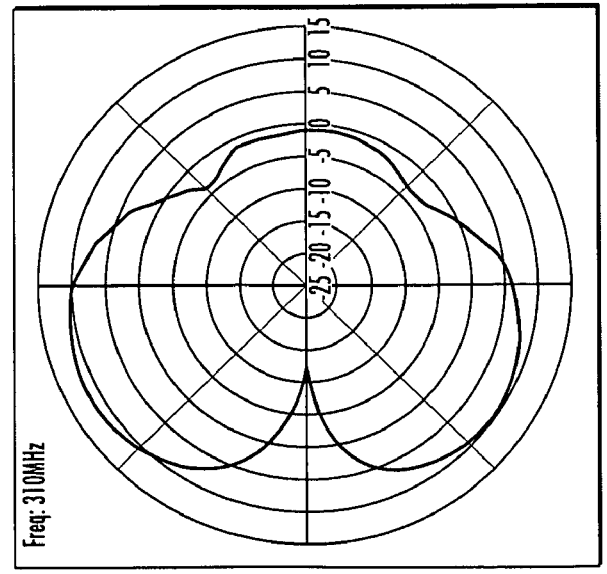

FIGS. 8, 9, and 10 illustrate vertical polarization gain for the antenna assembly at frequencies of 310 MHz, 315 MHz, and 320 MHz, respectively, when the antenna assembly is mounted with the support oriented in a generally vertical plane and with a second, short axis (FIG. 1) of the antenna assembly oriented generally vertically. And, FIGS. 11, 12, and 13 illustrate horizontal polarization gain for the antenna assembly at frequencies of 310 MHz, 315 MHz, and 320 MHz, respectively, when the antenna assembly is mounted with the support oriented in a generally vertical plane and with the second axis oriented generally vertically.

Figure 16:
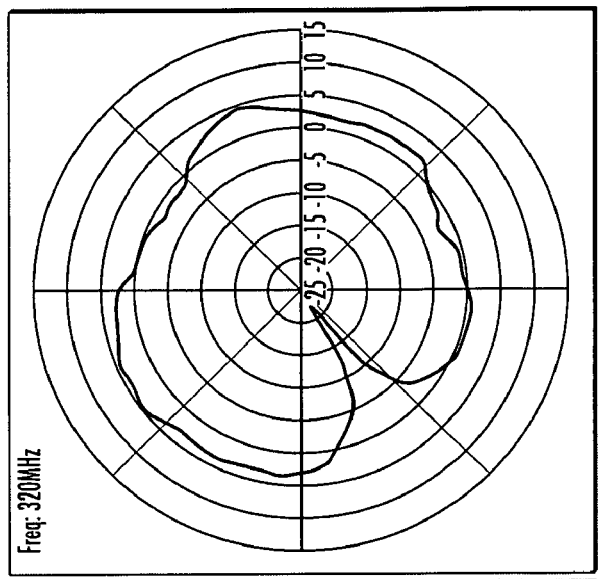
Figure 15:
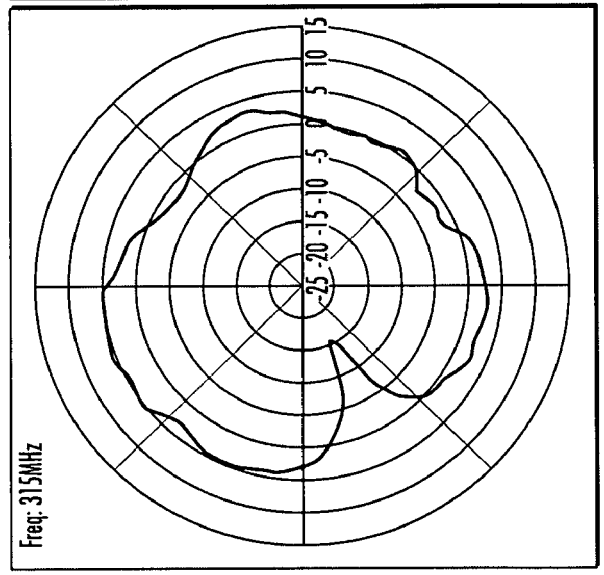
Figure 14:
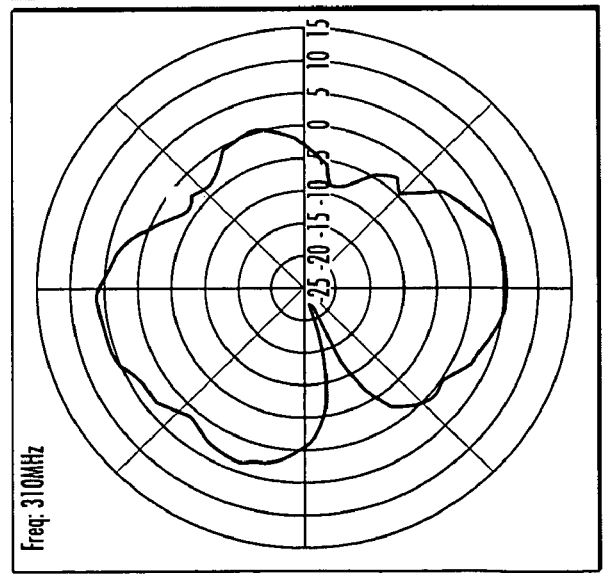
Figure 19:
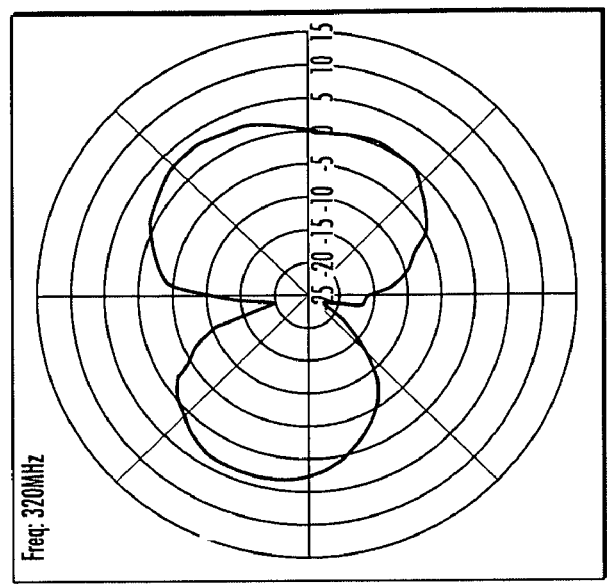
Figure 18:
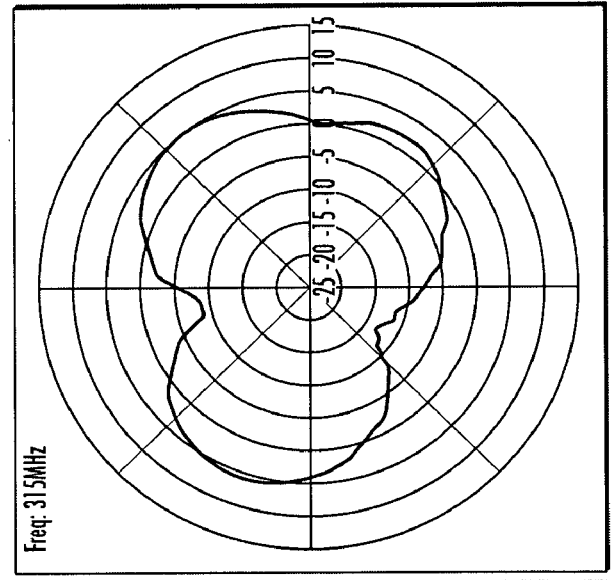
Figure 17:
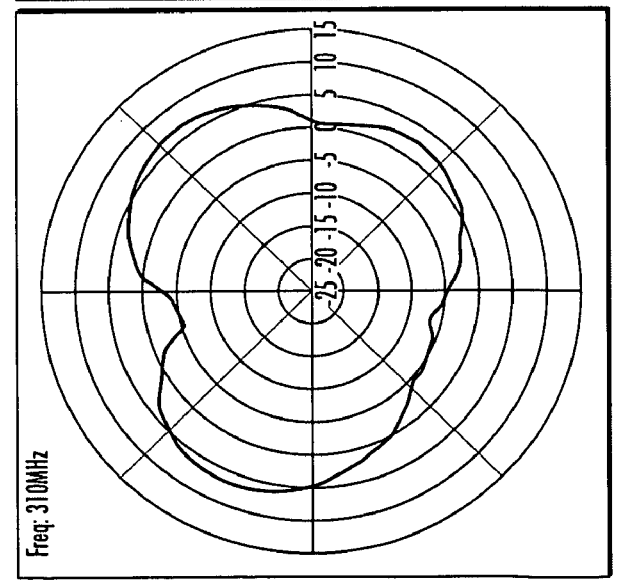

FIGS. 14, 15, and 16 illustrate vertical polarization gain for the antenna assembly at frequencies of 310 MHz, 315 MHz, and 320 MHz, respectively, when the antenna assembly is mounted with the support oriented in a generally horizontal plane. And, FIGS. 17, 18, and 19 illustrate horizontal polarization gain for the antenna assembly at frequencies of 310 MHz, 315 MHz, and 320 MHz, respectively, when the antenna assembly is mounted with the support oriented in a generally horizontal plane.

Table 1 indicates maximum peak gain and average gain of the antenna assembly, as indicated in FIGS. 2 through 19, for each of the different mounting positions of the antenna assembly (previously described), and for each of the vertical and horizontal polarizations and each of the 310 MHz, 315 MHz, and 320 MHz frequencies.

TABLE 1

| | Example Gain | | |
|---|---|---|---|
| FIG. | Polarization | Frequency (MHz) | Maximum Peak Gain (dBi) | Average Gain (dBi) |
| 2 | Vertical | 310 | 5.17 | 1.27 |
| 3 | Vertical | 315 | 5.16 | 1.76 |
| 4 | Vertical | 320 | 7.44 | 3.26 |
| 5 | Horizontal | 310 | −4.60 | −8.68 |
| 6 | Horizontal | 315 | −6.87 | −13.85 |
| 7 | Horizontal | 320 | −4.58 | −9.18 |
| 8 | Vertical | 310 | 10.44 | 5.41 |
| 9 | Vertical | 315 | 10.96 | 5.59 |
| 10 | Vertical | 320 | 10.60 | 5.08 |
| 11 | Horizontal | 310 | 11.67 | 5.10 |
| 12 | Horizontal | 315 | 10.58 | 3.86 |
| 13 | Horizontal | 320 | 8.38 | 1.21 |
| 14 | Vertical | 310 | 6.16 | 1.00 |
| 15 | Vertical | 315 | 5.65 | 1.58 |
| 16 | Vertical | 320 | 4.85 | 1.18 |
| 17 | Horizontal | 310 | 6.68 | 2.10 |
| 18 | Horizontal | 315 | 5.62 | 0.39 |
| 19 | Horizontal | 320 | 3.65 | −1.86 |

Figure 20:
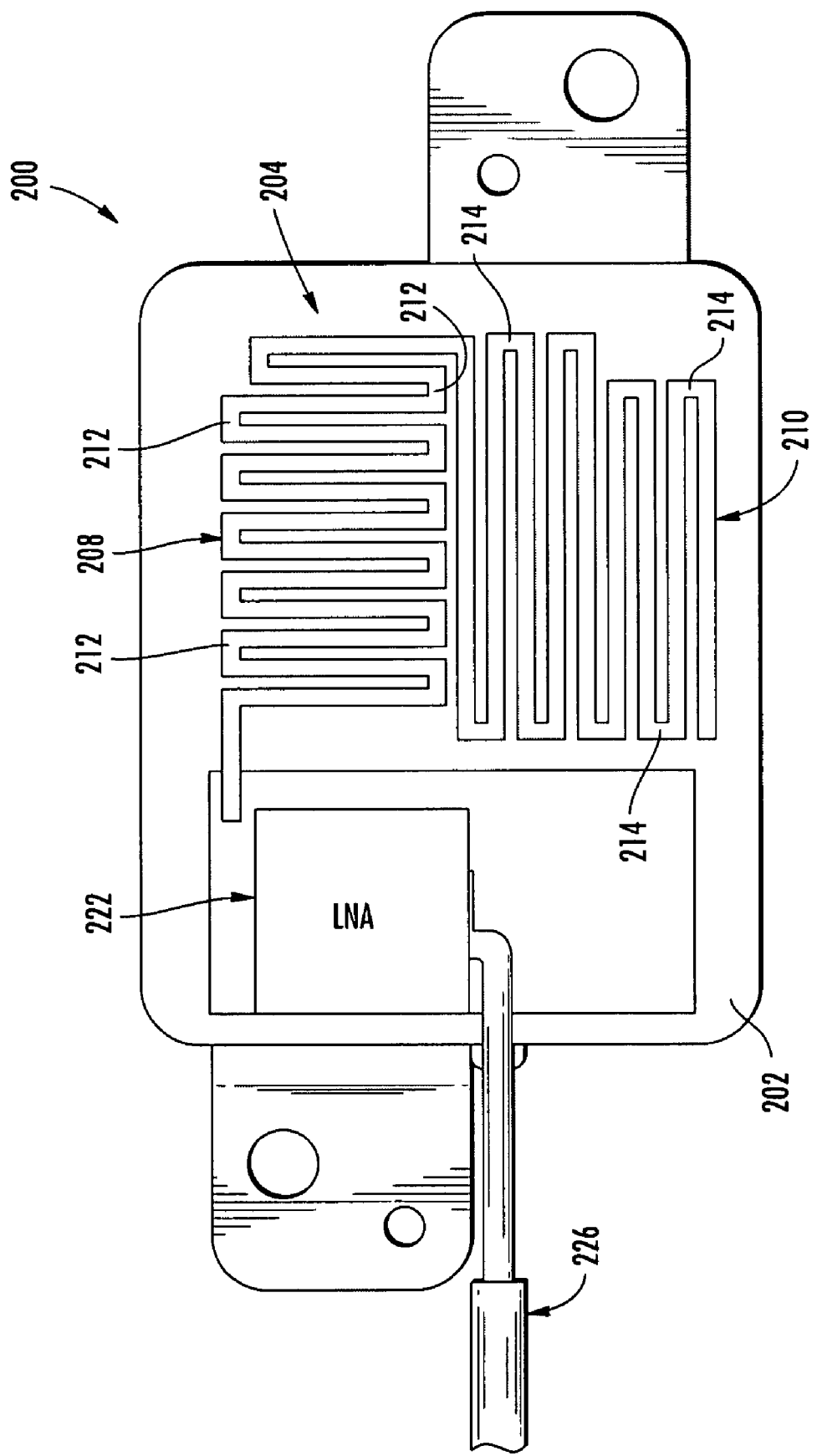
FIG. 20 is a plan view of another example embodiment of an antenna assembly including one or more aspects of the present disclosure.

FIG. 20 illustrates another example embodiment of an antenna assembly 200 including one or more aspects of the present disclosure. The antenna assembly 200 of this embodiment is similar to the antenna assembly of FIG. 1 previously described. For example, the antenna assembly 200 generally includes a support 202, an antenna element 204 supported by the support 202, an amplifier 222 coupled to the antenna element 204, and a transmission line 226 coupled to the amplifier 222. And, the antenna element 204 includes a generally folded design, shape, etc. such that the antenna element 204 has a first meandering, bending, etc. portion 208 and a second meandering, bending, etc. portion 210, with the first meandering portion 208 offset about ninety degrees relative to the second meandering portion 210. In this embodiment, however, the first meandering portion 208 includes twelve bending points 212 while the second meandering portion 210 includes eight bending points 214 (e.g., as compared to six bending points 114 as included in the antenna assembly 100 of FIG. 1, etc.).

FIG. 21 illustrates still another example embodiment of an antenna assembly 300 including one or more aspects of the present disclosure. The illustrated antenna assembly 300 generally defines a half wave dipole antenna assembly operable, for example, at a typical frequency of about 433 megahertz (MHz). And, the example antenna assembly 300 of this embodiment may be included, for example, as part of a remote keyless entry module of a vehicle, etc. for receiving signals in connection with desired vehicle operations such as locking and/or unlocking vehicle doors. The antenna assembly 300 may be tuned to a center frequency between about 432 MHz and about 434 MHz, inclusive, or between about 428 MHz and about 438 MHz, inclusive, or between bands of other frequencies, etc. within the scope of the present disclosure. And, in some example embodiments, antenna assemblies may be configured such that the antenna assemblies are operable at a single frequency of 433 MHz.

As shown in FIG. 21, the illustrated antenna assembly 300 generally includes a support 302, and first and second antenna elements 330 and 332 supported by the support 302 (e.g., coupled to the support 302, etc.). The support 302 may be formed from suitable material such as, for example, plastics, composites, low dielectric constant materials, other nonconductive materials, etc. suitable, for example, for supporting the first and second antenna elements 330 and 332. The first antenna element 330 is coupled to the support 302 in a generally mirror image orientation relative to the second antenna element 332. And, the first and/or second antenna elements 330 and/or 332 may be coupled to the support 302 as desired my mechanical fasteners, welds, etc. within the scope of the present disclosure. The support 302 and first and second antenna elements 330 and 332 may be included within (e.g., mounted within, etc.) or formed as part of a housing (not shown) for protecting the first and second antenna elements 330 and 332 from damage, ingress of debris, etc. In the illustrated embodiment, the portion of the support 302 to which the first and second antenna elements 330 and 332 are coupled does not include a circuit board, and the illustrated first and second antenna elements 330 and 332 are not etched onto the support 302.

The illustrated first and second antenna elements 330 and 332 are each substantially similar in shape, with generally mirror image orientations. The first antenna element 330 includes a generally folded design, shape, etc. with a first meandering, bending, etc. portion 334 and a second meandering, bending, etc. portion 336 (e.g., for providing extended length to the antenna elements 330, for providing a desired length to the antenna element 330 (e.g., for receiving desired frequencies, etc.), etc.). The first meandering portion 334 is offset about ninety degrees relative to the second meandering portion 336. And, the first meandering portion 334 includes eleven bending points 338, and the second meandering portion 336 includes nineteen bending points 340. In the illustrated embodiment, the respective bending points 338 and 340 of each of the first and second meandering portions 334 and 336 are formed between generally parallel straight portions 342 and 344 of the first and second meandering portions 334 and 336, respectively. The number of bending points 338 and 340 of the first antenna element 330 (e.g., of the first and second meandering portions 334 and 336, etc.) may be adjusted as desired to help tune the antenna assembly 300 to receive one or more desired frequencies (e.g., for adjusting a length of the antenna element 330, etc.).

Similarly, the second antenna element 332 includes a generally folded design, shape, etc. with a first meandering, bending, etc. portion 348 and a second meandering, bending, etc. portion 350 (e.g., for providing extended length to the antenna elements 332, for providing a desired length to the antenna element 332 (e.g., for receiving desired frequencies, etc.), etc.). And, as with the first antenna element 330, the first meandering portion 348 of the second antenna element 332 is offset about ninety degrees relative to the second meandering portion 350. In addition, the first meandering portion 348 includes eleven bending points 352 and the second meandering portion 350 includes nineteen bending points 354. In the illustrated embodiment, the bending points 352 and 354 of each of the first and second meandering portions 348 and 350 are formed between generally parallel straight portions 356 and 358 of the first and second meandering portions 348 and 350, respectively. The number of bending points 352 and 354 of the second antenna element 332 (e.g., of the first and second meandering portions 348 and 350, etc.) may be adjusted as desired to help tune the antenna assembly 300 to receive one or more desired frequencies (e.g., for adjusting a length of the antenna element 332, etc.).

The first and/or second meandering portions 334 and/or 336 and/or 348 and/or 350 of the first and/or second antenna elements 330 and/or 332 may be oriented, shaped, etc. differently than illustrated herein (e.g., offset by amounts other than ninety degrees, oriented differently than each other, shaped differently than each other, etc.) within the scope of the present disclosure. And, one or more of the first meandering portions 334 and 348 and second meandering portions 336 and 350 (of each of the first and second antenna elements 330 and 332) may include more than or less than eleven bending points 338 and 352 and/or nineteen bending points 340 and 354, respectively, within the scope of the present disclosure.

The illustrated first and second antenna elements 330 and 332 may each be formed by suitable operations from a sheet of metallic material. For example, the folded design of each of the first and second antenna elements 330 and 332 may be stamped from a sheet of metallic material, such that each of the first and second antenna elements 330 and 332 generally includes (e.g., defines, etc.) a stamped and folded metallic sheet antenna element. Suitable metallic materials for forming the first and/or second antenna elements 330 and/or 332 may include, for example, copper, silver, gold, alloys, combinations thereof, other electrically-conductive materials, etc. The first and second antenna elements 330 and 332 (and/or the first meandering portions 334 and 348 and/or the second meandering portions 336 and 350 of each of the first and second antenna elements 330 and 332) may each be made of different materials within the scope of the present disclosure.

With continued reference to FIG. 21, an amplifier 322 (e.g., a low noise amplifier (LNA), etc.) is provided for amplifying signals received by the first and second antenna elements 330 and 332. The amplifier 322 is supported by (e.g., coupled to, etc.) the support 302 toward an end potion of the support 302 and generally between the second meandering portions 336 and 350 of the respective first and second antenna elements 330 and 332. And, the amplifier 322 is coupled (e.g., electrically coupled via solder connections, etc.) to each of the first and second antenna elements 330 and 332 for operation by generally straight end portions 360 and 362 of the respective first and second antenna elements 330 and 332 located adjacent each of the antenna elements' first meandering portions 334 and 348.

A transmission line 326 is coupled (e.g., electrically coupled via solder connections, etc.) to the amplifier 322 for outputting amplified signals from the amplifier 322 to a suitable power source (e.g., a radio frequency power source, etc.), receiver, etc. The transmission line 326 couples to the amplifier 322 such that the amplifier 322 is disposed (e.g., electrically disposed, etc.) generally between the first and second antenna elements 330 and 332 and the transmission line 326 (e.g., with the straight end portions 360 and 362 of the first and second antenna elements 330 and 332 generally aligned with the transmission line 326, etc.). The transmission line 326 may include any suitable line such as, for example, a coaxial cable, etc. within the scope of the present disclosure.

FIGS. 22 through 39 are example radiation patterns illustrating gain (in decibels referenced to isotropic gain (dBi)) for the example antenna assembly shown in FIG. 21. More particularly, FIGS. 22, 23, and 24 illustrate vertical polarization gain for the antenna assembly at frequencies of 428 MHz, 433 MHz, and 438 MHz, respectively, when the antenna assembly is mounted with the support oriented in a generally vertical plane and with a first, long axis (FIG. 21) of the antenna assembly oriented generally vertically. And, FIGS. 25, 26, and 27 illustrate horizontal polarization gain for the antenna assembly at frequencies of 428 MHz, 433 MHz, and 438 MHz, respectively, when the antenna assembly is mounted with the support oriented in a generally vertical plane and with the first axis oriented generally vertically.

FIGS. 28, 29, and 30 illustrate vertical polarization gain for the antenna assembly at frequencies of 428 MHz, 433 MHz, and 438 MHz, respectively, when the antenna assembly is mounted with the support oriented in a generally vertical plane and with a second, short axis (FIG. 21) of the antenna assembly oriented generally vertically. And, FIGS. 31, 32, and 33 illustrate horizontal polarization gain for the antenna assembly at frequencies of 428 MHz, 433 MHz, and 438 MHz, respectively, when the antenna assembly is mounted with the support oriented in a generally vertical plane and with the second axis oriented generally vertically.

FIGS. 34, 35, and 36 illustrate vertical polarization gain for the antenna assembly at frequencies of 428 MHz, 433 MHz, and 438 MHz, respectively, when the antenna assembly is mounted with the support oriented in a generally horizontal plane. And, FIGS. 37, 38, and 39 illustrate horizontal polarization gain for the antenna assembly at frequencies of 428 MHz, 433 MHz, and 438 MHz, respectively, when the antenna assembly is mounted with the support oriented in a generally horizontal plane.

Table 2 indicates maximum peak gain and average gain of the antenna assembly, as indicated in FIGS. 22 through 39, for each of the different mounting positions of the antenna assembly (previously described), and for each of the vertical and horizontal polarizations and each of the 428 MHz, 433 MHz, and 438 MHz frequencies.

TABLE 2

Example Gain

| FIG. | Polarization | Frequency (MHz) | Maximum Peak Gain (dBi) | Average Gain (dBi) |
| --- | --- | --- | --- | --- |
| 22 | Vertical | 428 | 9.49 | 2.93 |
| 23 | Vertical | 433 | 9.98 | 3.70 |
| 24 | Vertical | 438 | 8.27 | 2.36 |
| 25 | Horizontal | 428 | −1.41 | −4.76 |
| 26 | Horizontal | 433 | 0.32 | −5.41 |
| 27 | Horizontal | 438 | 0.93 | −4.93 |
| 28 | Vertical | 428 | 7.71 | 2.96 |
| 29 | Vertical | 433 | 8.84 | 3.67 |
| 30 | Vertical | 438 | 8.31 | 1.89 |
| 31 | Horizontal | 428 | 8.82 | 2.44 |

TABLE 2-continued

Example Gain

| FIG. | Polarization | Frequency (MHz) | Maximum Peak Gain (dBi) | Average Gain (dBi) |
| --- | --- | --- | --- | --- |
| 32 | Horizontal | 433 | 10.36 | 3.75 |
| 33 | Horizontal | 438 | 8.26 | 2.22 |
| 34 | Vertical | 428 | 7.96 | 2.69 |
| 35 | Vertical | 433 | 8.46 | 3.76 |
| 36 | Vertical | 438 | 6.57 | 1.53 |
| 37 | Horizontal | 428 | 9.62 | 3.90 |
| 38 | Horizontal | 433 | 10.21 | 4.54 |
| 39 | Horizontal | 438 | 7.98 | 1.61 |

FIG. 40 illustrates another example embodiment of an antenna assembly 400 including one or more aspects of the present disclosure. The antenna assembly 400 of this embodiment is similar to the antenna assembly of FIG. 1 previously described. For example, the antenna assembly 400 generally includes a support 402, an antenna element 404 supported by the support 402, an amplifier 422 (e.g., an LNA, etc.) coupled to the antenna element 404, and a transmission line 426 coupled to the amplifier 422. And, the antenna element 404 includes a generally folded design, shape, etc. such that the antenna element 404 has a first meandering, bending, etc. portion 408 and a second meandering, bending, etc. portion 410, with the first meandering portion 408 offset about ninety degrees relative to the second meandering portion 410. The first meandering portion 408 includes twelve bending points 412, and the second meandering portion 410 includes six bending points 414. In this embodiment, however, the second meandering portion 410 includes a portion 470 extending generally inwardly of the support 402 (e.g., for use in tuning the antenna assembly 400 to receive one or more desired frequencies, etc.).

In another example embodiment of the present disclosure, a method of making an antenna assembly for a remote keyless entry module generally includes coupling a stamped and folded metallic sheet antenna element to a support other than a circuit board, coupling the antenna element to an amplifier for amplifying signals received from the antenna element, and coupling the amplifier to a transmission line for outputting the amplified signals from the amplifier. The antenna assembly may define a monopole antenna assembly operable at a frequency of about 315 megahertz, a dipole antenna assembly operable at a frequency of about 433 megahertz, etc.

The antenna assemblies of the present disclosure may provide lower cost antenna assemblies for use with wireless than, for example, antenna assemblies requiring etching antenna elements on circuit boards. In addition, the antenna assemblies of the present disclosure may provide increased gain and may be functional over extended wireless access ranges. And, air link performance may be enhanced as more wireless access range is available.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An antenna assembly for a remote communications module, the antenna assembly comprising:
   a support;
   a metallic antenna element coupled the support, the metallic antenna element having a generally meandering configuration;
   an amplifier coupled to the metallic antenna element; and
   a transmission line coupled to the amplifier;
   wherein the amplifier is disposed generally between the metallic antenna element and the transmission line;
   wherein the metallic antenna element is a first metallic antenna element, the antenna assembly further comprising a second metallic antenna element mounted on the support and coupled to the amplifier and having a generally meandering configuration;
   wherein:
      the first metallic antenna element includes a first meandering portion and a second meandering portion, said first meandering portion being offset about ninety degrees relative to said second meandering portion; and
      the second metallic antenna element includes a first meandering portion and a second meandering portion, said first meandering portion being offset about ninety degrees relative to said second meandering portion.

2. The antenna assembly of claim 1, wherein the amplifier includes a low noise amplifier.

3. The antenna assembly of claim 1, wherein each first meandering portion includes at least twelve bending points and each second meandering portion includes at least six bending points.

4. The antenna assembly of claim 1, wherein the second metallic antenna element is mounted on the support in a generally mirror image orientation relative to the first metallic antenna element.

5. The antenna assembly of claim 1, wherein the first meandering portion of the first metallic antenna element includes at least eleven bending points and the second meandering portion of the first metallic antenna element includes at least nineteen bending points, and wherein the first meandering portion of the second metallic antenna element includes at least eleven bending points and the second meandering portion of the second metallic antenna element includes at least nineteen bending points.

6. The antenna assembly of claim 1, wherein the metallic antenna element includes a stamped metallic sheet antenna element.

7. The antenna assembly of claim 1, wherein the antenna assembly defines a dipole antenna assembly operable at a frequency of about 433 megahertz.

8. A remote keyless entry module comprising the antenna assembly of claim 1.

9. A tire pressure monitoring system comprising the antenna assembly of claim 1.

* * * * *